United States Patent
Gomi

(10) Patent No.: US 7,913,807 B2
(45) Date of Patent: Mar. 29, 2011

(54) VEHICLE DOOR STRUCTURE

(75) Inventor: Atsushi Gomi, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 1203 days.

(21) Appl. No.: 11/546,445

(22) Filed: Oct. 12, 2006

(65) Prior Publication Data
US 2007/0086609 A1    Apr. 19, 2007

(30) Foreign Application Priority Data
Oct. 14, 2005   (JP) .................. 2005-299648

(51) Int. Cl.
*H04R 1/02* (2006.01)
(52) U.S. Cl. ......... 181/150; 181/149; 181/151; 381/389
(58) Field of Classification Search .................. 181/141, 181/148, 149, 151; 381/302, 86, 389
See application file for complete search history.

(56) References Cited

U.S. PATENT DOCUMENTS

| | | | | |
|---|---|---|---|---|
| 4,943,109 A | * | 7/1990 | Skrbina et al. | 296/146.4 |
| 5,482,343 A | * | 1/1996 | Bradac | 296/39.1 |
| 5,529,370 A | * | 6/1996 | Veit | 296/146.7 |
| RE36,323 E | * | 10/1999 | Thompson et al. | 181/286 |
| 6,493,919 B2 | * | 12/2002 | Morrison et al. | 29/434 |
| 2003/0165664 A1 | * | 9/2003 | Carroll et al. | 428/138 |
| 2004/0120541 A1 | * | 6/2004 | Maekawa et al. | 381/389 |
| 2004/0134711 A1 | * | 7/2004 | Yoshimi et al. | 181/207 |
| 2004/0169396 A1 | * | 9/2004 | Dooley et al. | 296/146.7 |
| 2004/0264729 A1 | * | 12/2004 | Ito et al. | 381/389 |
| 2005/0052051 A1 | * | 3/2005 | Kohara et al. | 296/146.7 |

FOREIGN PATENT DOCUMENTS

| | | | |
|---|---|---|---|
| JP | 9-37371 A | | 2/1997 |
| JP | 09037371 A | * | 2/1997 |
| JP | 2001-18653 A | | 1/2001 |
| JP | 2005-26817 A | | 1/2005 |

* cited by examiner

*Primary Examiner* — Elvin G Enad
*Assistant Examiner* — Jeremy Luks
(74) *Attorney, Agent, or Firm* — Birch, Stewart, Kolasch & Birch, LLP

(57) ABSTRACT

A vehicle door structure, comprising: a loudspeaker mounting hole provide in a door inner panel of a vehicle; a first service hole provided in the door inner panel and located in the vicinity of the loudspeaker mounting hole; a second service hole provided in the door inner panel and located at a position more distant than the first service hole from the loudspeaker mounting hole; a loudspeaker mounted in the loudspeaker mounting hole; a plate-shaped member screwed to the door inner panel for closing the first service hole; and a sound absorbing member provided to close the second service hole.

10 Claims, 4 Drawing Sheets

Rear ←→ Front

Rear ⟵⟶ Front ns for improving the tone quality of a reproduced sound from a loudspeaker.

2. Description of the Related Art

Generally, audio equipment is installed on a vehicle, and an occupant can hear a sound, generated by the audio equipment, from a loudspeaker provided in a door device or the like. This loudspeaker is mounted via a bracket or the like in a loudspeaker mounting hole formed in a door inner panel of the door device. Such a conventional vehicle door structure is disclosed, for example, in Japanese Unexamined Patent Publication No. 2005-26817.

The door device has a double structure having an internal space formed by the door inner panel and a door outer panel. In this internal space, devices such as a window glass and an elevating device for elevating and lowering the window glass are accommodated, and a harness connected to these devices is wired. Thus, a plurality of service holes for mounting and equipping the different devices are bored in different sizes in the door inner panel.

If the loudspeaker is mounted on the conventional vehicle door structure, however, the above-mentioned service holes remain open, and the rigidity of the surroundings of the loudspeaker is insufficient. Thus, the essential performance of the loudspeaker cannot be exhibited, or a sound radiated into a vehicle compartment through the service hole interferes with a direct sound from the loudspeaker, thereby deteriorating tone quality. It may be conceivable to provide no service holes, but this is not a realistic measure from the points of view of maintainability, cost and weight.

SUMMARY OF THE INVENTION

The present invention has been accomplished to solve the above-described problems. It is an object of the invention to provide a vehicle door structure which can effectively improve the tone quality of a loudspeaker.

To attain the above object, there is provided a vehicle door structure, comprising:

a loudspeaker mounting hole provide in a door inner panel of a vehicle;

a first service hole provided in the door inner panel and located in the vicinity of the loudspeaker mounting hole;

a second service hole provided in the door inner panel and located at a position more distant than the first service hole from the loudspeaker mounting hole;

a loudspeaker mounted in the loudspeaker mounting hole;

a plate-shaped member screwed to the door inner panel for closing the first service hole; and a sound absorbing member provided to close the second service hole.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE INVENTION

Figure 1:
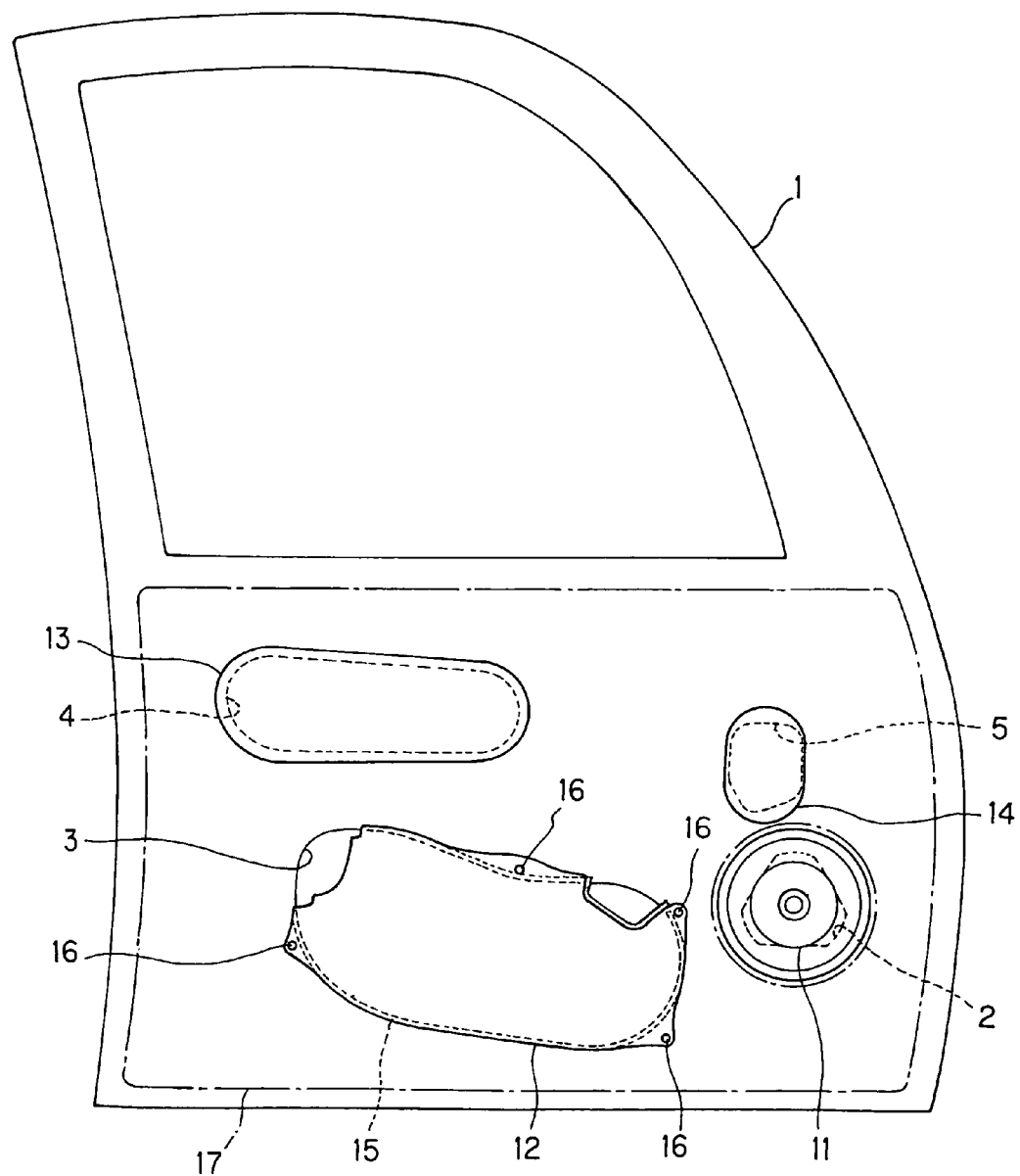
FIG. 1 is a schematic configurational drawing of a vehicle door structure according to an embodiment of the present invention.
Figure 2:
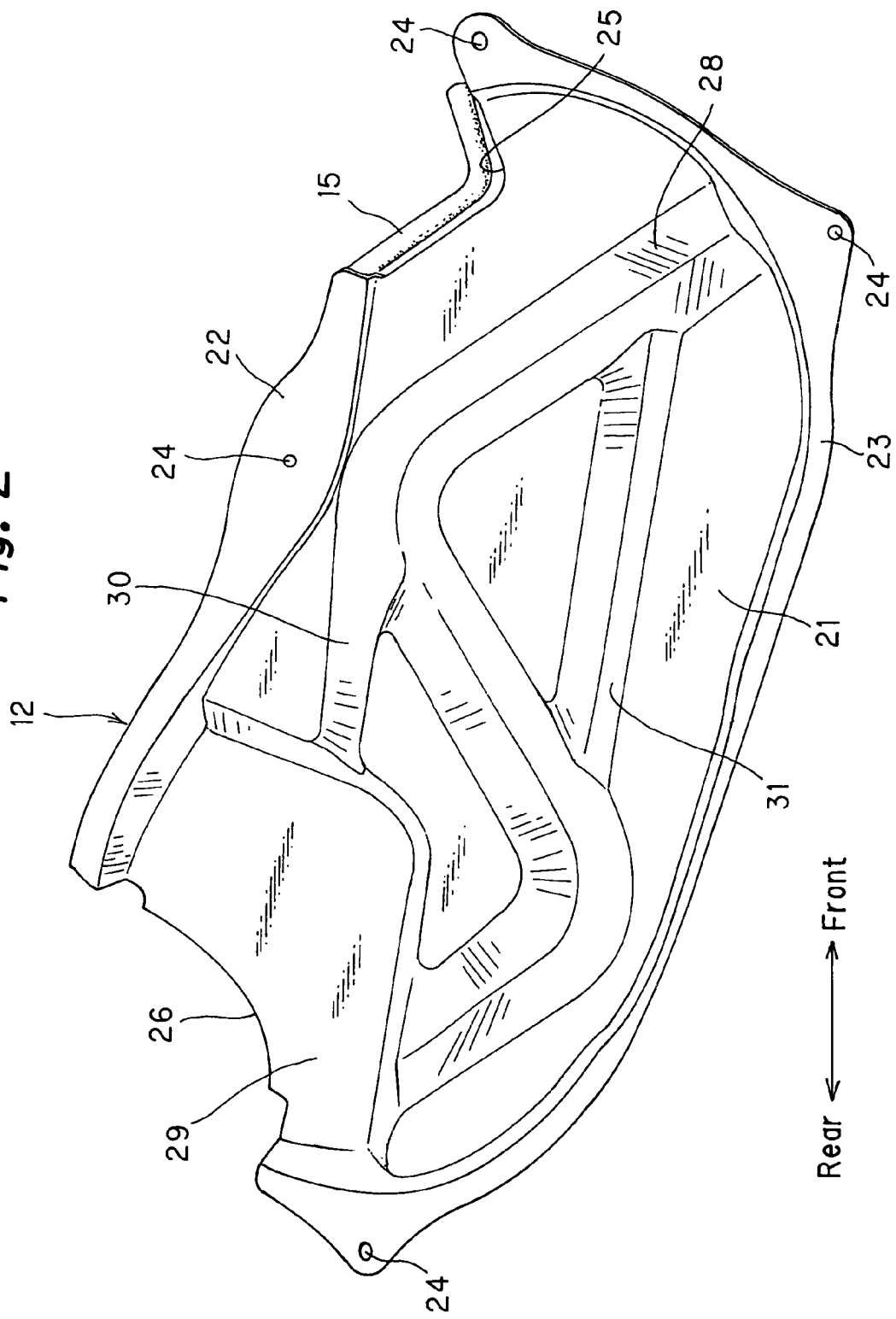
FIG. 2 is a view showing the surface of an acoustic plate.
Figure 3:
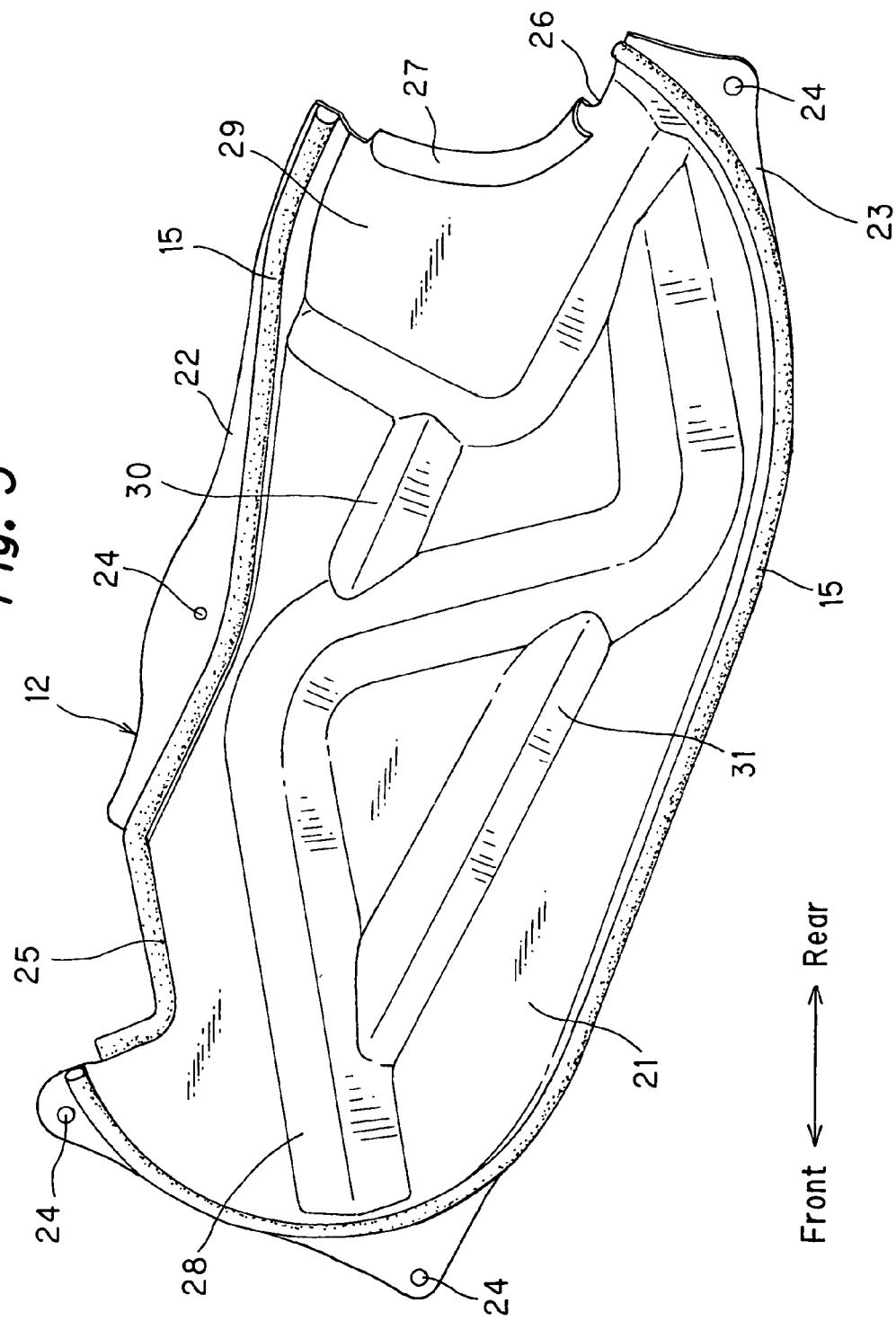
FIG. 3 is a view showing the back of the acoustic plate.
Figure 4:
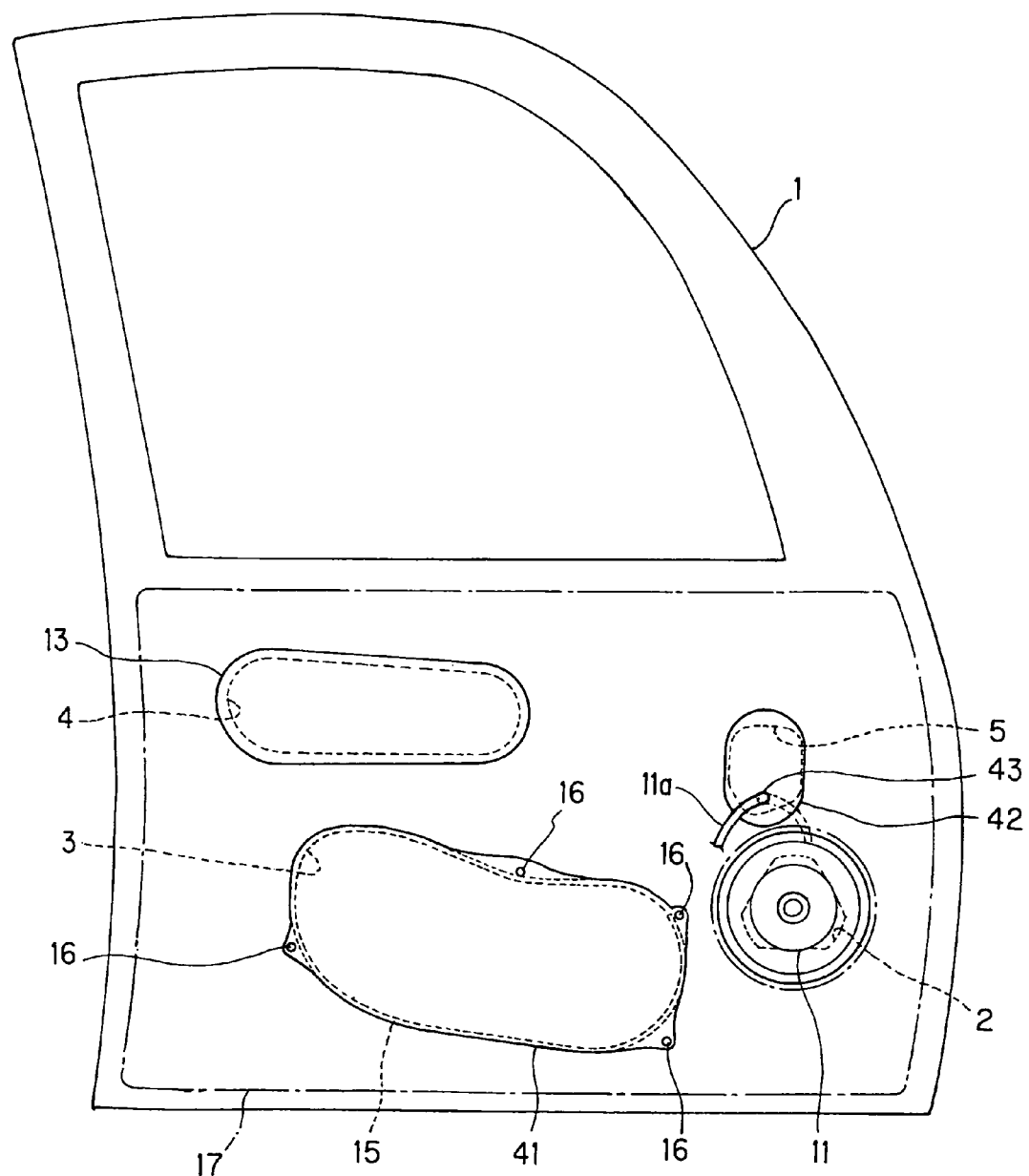
FIG. 4 is a schematic configurational drawing of a vehicle door structure according to another embodiment of the present invention.

A vehicle door structure according to the present invention will now be described in detail with reference to the accompanying drawings. FIG. 1 is a schematic configurational drawing of the vehicle door structure according to an embodiment of the present invention. FIG. 2 is a view showing the surface of an acoustic plate. FIG. 3 is a view showing the back of the acoustic plate. FIG. 4 is a schematic configurational drawing of the vehicle door structure according to another embodiment of the present invention.

A door inner panel 1 shown in FIG. 1 is provided inwardly, in a vehicle width direction, of a door device provided on the side of a passenger seat (the seat next to a driver seat) of a vehicle (not shown). An internal space is formed between the door inner panel 1 and a door outer panel provided outwardly of the door inner panel 1 to impart a double structure to the door device. In this internal space, devices such as a window glass (not shown) and an elevating device (not shown) for elevating and lowering the window glass are accommodated, and a harness connected to these devices is wired.

As shown in FIG. 1, a loudspeaker mounting hole 2 and service holes 3, 4, 5 are formed in the door inner panel 1. The loudspeaker mounting hole 2 is a hole for mounting a loudspeaker 11 which is a sound source of audio equipment installed in the vehicle. The service holes 3, 4, 5 are used for dismounting the above devices. The service hole 3 disposed in the vicinity of the loudspeaker mounting hole 2 is closed with an acoustic plate (plate-shaped member) 12 which comprises a plate-shaped sheet metal. The service hole 4 disposed at a position remote from the loudspeaker mounting hole 2 is closed with a plate-shaped sound absorbing member 13 which comprises a urethane material or the like. The service hole 5 having a smaller opening than the service holes 3, 4 is closed with a plate-shaped resin member 14 comprising a PP material or the like.

The acoustic plate 12 is mounted at its periphery by rivets (screws) 16 via a rubber member (elastic seal member) 15 (see FIG. 3) which is an elastic body. The sound absorbing member 13 is mounted via a waterproof film 17. The waterproof film 17 is disposed outwardly, in the vehicle width direction, of the sound absorbing member 13 as mentioned above, and is also stuck to cover the surface of the inner panel 1 (the surface inward in the vehicle width direction), namely, to cover the acoustic plate 12 and the resin member 14.

Next, the acoustic plate 12 will be described with reference to FIGS. 2 and 3. As shown in FIGS. 2 and 3, the acoustic plate 12 has a closed surface portion 21 formed flatly in a nearly vertical direction. Flange portions 22, 23 protruding inwardly in the vehicle width direction (on the surface side of the acoustic plate 12) are formed in a part of the outer peripheral edge of the closed surface portion 21. Rivet mounting holes 24 for mounting the rivets 16 are formed in the flange portions 22, 23, and the rubber member 15 is also stuck to the flange portions 22, 23.

A front notched portion 25 for wiring the harness for the respective devices is formed in a front region of the outer edge of the acoustic plate 12, while a rear notched portion 26 for wiring the harness for the respective devices is similarly formed in a rear region of the outer edge of the acoustic plate 12. The rubber member 15 extending from the flange portion 22 is stuck to an edge portion of the front notched portion 25. The rubber member 15 provided at the edge portion of the front notched portion 25 is stuck such that a nearly half of its widthwise length remains detached from the edge portion. On the other hand, an R-curved portion 27 bent in a nearly R-shape outwardly in the vehicle width direction (on the back side of the acoustic plate 12) is formed at the edge portion of the rear notched portion 26.

A wavy rib 28, a rectangular rib 29, and connecting ribs 30, 31, all protruding outwardly in the vehicle width direction (on the back side of the acoustic plate 12), are formed in the closed surface portion 21. The wavy rib 28 is formed in a wavy shape in the fore-and-aft direction of the closed surface portion 21. The rectangular rib 29 is formed in a nearly rectangular shape so as to surround the rear notched portion 26 at the rear end of the wavy rib 28. The connecting rib 30 is formed to couple the wavy rib 28 and the rectangular rib 29 in the fore-and-aft direction, while the connecting rib 31 is formed to couple two sites of the wavy rib 28 in the fore-and-aft direction.

That is, the nearer to the loudspeaker 11, the more influence is exerted by vibration due to a sound, and the farther from the loudspeaker 11, the less influence is exerted by the vibration. Thus, higher rigidity is considered to be required for a site nearer the loudspeaker 11, and rigidity is considered to be less necessary for a site more distant from the loudspeaker 11. Hence, the service hole 3 provided in the vicinity of the loudspeaker 11 is closed with the acoustic plate 12 having rigidity, while the service hole 4 located remotely from the loudspeaker 11 is closed with the sound absorbing member 13 having lower rigidity than the rigidity of the acoustic plate 12. The service hole 5 is formed near the loudspeaker 11, but the rigidity of its region is relatively high because its diameter is smaller than those of the service holes 3 and 4. Thus, the service hole 5 is closed with the resin member 14 having lower rigidity than that of the acoustic plate 12. By these measures, the rigidity of the door inner panel 1 is increased, and the tone quality of the reproduced sound of the loudspeaker 11 is improved. Furthermore, the use of the sound absorbing member 13 and the resin member 14, which are lighter and cheaper than the acoustic plate 12, achieves weight reduction and cost reduction. Besides, the sound absorbing member 13 can prevent the entry of a sound, which becomes a hindrance to an improvement in an acoustic field atmosphere within the vehicle compartment, from outside the door inner panel 1. Thus, the acoustic field atmosphere within the vehicle compartment can be improved, and the occupant can hear the sound issued by the loudspeaker 11 in a better state. That is, the materials for the members are selected based on the opening positions and sizes of the service holes, whereby the rigidity of the door inner panel 1 and the tone quality of the loudspeaker 11 can be improved. In addition, weight reduction and cost reduction can be achieved.

The flange portions 22, 22 are formed at the outer peripheral edge of the acoustic plate 12, and the flange portions 22, 23 are mounted on the service hole 3 with the use of the rivets 16, thus making easy detachment possible, and improving maintainability. Moreover, the flange portions 22, 23 are mounted via the rubber member 15, so that vibrations can be damped, the sealability of sounds can be enhanced, and the occurrence of beat noises can be prevented. Furthermore, the ribs 28, 29, 30, 31 are formed in the closed surface portion 21 of the acoustic plate 12, so that the acoustic plate 12 itself is also increased. Besides, the notched portions 25, 26 are formed in the acoustic plate 12. Thus, holes for wiring the harness for the loudspeaker 11 and the respective devices accommodated in the internal space need not be formed separately in the door inner panel 1, and the machining cost is kept down. In addition, the rubber member 15 extending from the flange portion 22 is provided, while detached, in the front notched portion 25, and the R-curved portion 27 is formed in the rear notched portion 26. Thus, damage to or breakage of the harness can be prevented.

Also, the sound absorbing member 13 is mounted on the service hole 4 via the waterproof film 17. Thus, even if rainwater enters the internal space, deterioration of the sound absorbing member 13 due to the rainwater can be prevented. Even if the rainwater enters through the loudspeaker mounting hole 2 and the service holes 3, 4, 5, the entry of the rainwater from the door device into the vehicle compartment can also be prevented.

As shown in FIG. 4, the service hole 3 may be closed with an acoustic plate 41, and the service hole 5 may be closed with a resin member 42. The acoustic plate 41 has no notched portions, and a through-hole 43 for passage of a harness 11a of the loudspeaker 11 is formed in the resin member 42. Because of this configuration, a simplified design can be adopted, and cost reduction can be achieved.

According to the vehicle door structure of the present invention, therefore, the acoustic plate 12 is screwed by the rivets 16 so as to close the service hole 3 located in the vicinity of the loudspeaker mounting hole 2, whereby the rigidity of the door inner panel 1 can be increased efficiently. Moreover, the sound absorbing member 13 is provided to close the service hole 4 which is located at a position more distant than the service hole 3 from the loudspeaker mounting hole 2. Thus, a sound, which becomes a hindrance to the improvement of the acoustic field atmosphere within the vehicle compartment, can be prevented from entering from outside the door inner panel 1. Consequently, the reproduced sound of the loudspeaker 11 can be presented, with a better tone quality, to the occupant.

Also, the acoustic plate 12 is composed of the sheet metal member, whereby the rigidity of the acoustic plate 12 per se can be increased. Thus, the tone quality of the reproduced sound of the loudspeaker 11 can be improved effectively.

Also, the acoustic plate 12 is screwed to the door inner panel 1 by the rivets 16 via the rubber member, whereby the occurrence of beat noises of the acoustic plate 12 can be prevented. Thus, the acoustic field atmosphere within the vehicle compartment can be ameliorated.

Also, the acoustic plate 12 is provided with the flange portions 22, 23 which are screwed to the outer peripheral edge of the service hole 3, whereby the ease of assembly to the service hole 3 can be increased. Further, the ribs 28, 29, 30, 31 protruding outwardly in the vehicle width direction are provided on the inner peripheral side of the flange portions 22, 23, whereby the rigidity of the acoustic plate 12 itself can be enhanced.

Also, the sound absorbing member 13 is provided to close the service hole 4 via the waterproof film 17, whereby the durability of the sound absorbing member 13 can be enhanced.

Also, the service hole 5 having a smaller opening area than those of the service holes 3, 4 is closed with the resin member 14. Thus, the tone quality of the reproduced sound of the loudspeaker 11 can be further improved, with an increase in the weight being curtailed.

Furthermore, the through-hole 43 for passage of the harness 11a of the loudspeaker 11 is formed in the resin member 42, whereby design simplification can be attained. Thus, the cost can be reduced.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle door structure, comprising:
   a loudspeaker mounting hole provide in a door inner panel of a vehicle;
   a first service hole provided in the door inner panel and located in a vicinity of the loudspeaker mounting hole;
   a second service hole provided in the door inner panel and located at a position more distant than the first service hole from the loudspeaker mounting hole;
   a loudspeaker mounted in the loudspeaker mounting hole;
   a plate-shaped member screwed to the door inner panel for closing the first service hole; and
   a sound absorbing member provided to close the second service hole, wherein
   the plate-shaped member comprises:
   flange portions constituting an outer peripheral edge of the plate-shaped member and screwed to an outer peripheral edge of the first service hole;
   a closed surface portion provided on an inner peripheral side of the flange portions and protruding outwardly in a vehicle width direction of the flange portions; and
   ribs provided in the closed surface portion.

2. The vehicle door structure according to claim 1, wherein the plate-shaped member is composed of a sheet metal member.

3. The vehicle door structure according to claim 1, wherein the plate-shaped member is screwed to a peripheral edge of the first service hole via an elastic seal member.

4. The vehicle door structure according to claim 2, wherein the plate-shaped member is screwed to a peripheral edge of the first service hole via an elastic seal member.

5. The vehicle door structure according to claim 1, wherein the sound absorbing member is provided to be mounted on a surface, inward in a vehicle width direction, of a waterproof film provided to cover the door inner panel from inside in the vehicle width direction, thereby closing the second service hole.

6. The vehicle door structure according to claim 2, wherein the sound absorbing member is provided to be mounted on a surface, inward in a vehicle width direction, of a waterproof film provided to cover the door inner panel from inside in the vehicle width direction, thereby closing the second service hole.

7. The vehicle door structure according to claim 3, wherein the sound absorbing member is provided to be mounted on a surface, inward in a vehicle width direction, of a waterproof film provided to cover the door inner panel from inside in the vehicle width direction, thereby closing the second service hole.

8. The vehicle door structure according to claim 4, wherein the sound absorbing member is provided to be mounted on a surface, inward in a vehicle width direction, of a waterproof film provided to cover the door inner panel from inside in the vehicle width direction, thereby closing the second service hole.

9. The vehicle door structure according claim 1 or 2, further comprising:
   a third service hole provided in the door inner panel and having a smaller opening area than opening areas of the first service hole and the second service hole; and
   a resin member provided to close the third service hole.

10. The vehicle door structure according to claim 9, wherein
    the resin member has a through-hole through which a harness of the loudspeaker passes.

* * * * *